United States Patent

[11] 3,622,657

[72] Inventors Howard C. North
Westfield, N.J.;
Charles W. Williamson, Seabrook, Tex.
[21] Appl. No. 860,610
[22] Filed Sept. 24, 1969
[45] Patented Nov. 23, 1971
[73] Assignee Esso Research and Engineering Company

[54] METHOD FOR FORMING AND COOLING THERMOPLASTIC FILM
8 Claims, 3 Drawing Figs.

[52] U.S. Cl....................................................... 264/89,
18/14 A, 264/95, 264/180, 264/237
[51] Int. Cl........................................................B29c 17/00,
B29c 25/00
[50] Field of Search............................................ 264/89, 95,
180, 181, 209, 237; 18/14 A, 14 S, 1 FZ

[56] References Cited
UNITED STATES PATENTS
3,090,998 5/1963 Heisterkamp et al. ......... 264/95
3,400,184 9/1968 Matsuo et al. ................. 264/89

FOREIGN PATENTS
1,123,318 8/1968 Great Britain................. 264/95

*Primary Examiner*—Robert F. White
*Assistant Examiner*—J. H. Silbaugh
*Attorney*—Chasan and Sinnock ABSTRACT: A method for forming and cooling thermoplastic film. The film is extruded downwardly in a molten condition and passed through a cooling cell containing a cooling liquid. A first stream of cooling liquid is passed in contact with lower part of the film at a high velocity in countercurrent turbulent flow. A second stream of cooling fluid is passed in contact with the upper part of the film at a low velocity in cocurrent laminar flow. The first and second streams are withdrawn from a transistion zone adjacent to the surface of the film at a medial point of the film. The film may be in tubular form and passed over a cooling mandrel positioned within the cooling cell. Cooling air is passed upwardly through the inside of the film to expand the film and prevent condensation of volatiles on the mandrel.

PATENTED NOV 23 1971          3,622,657
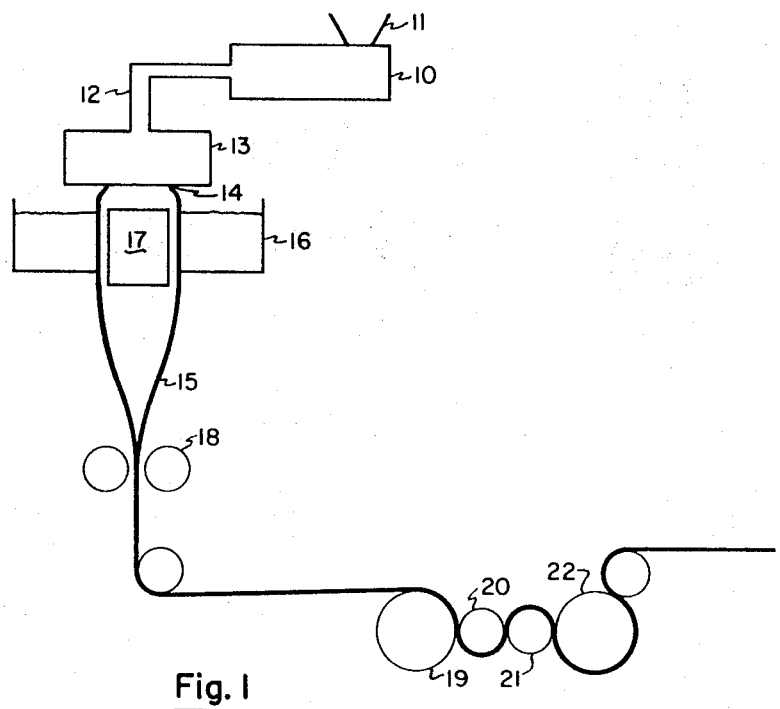
Fig. 1
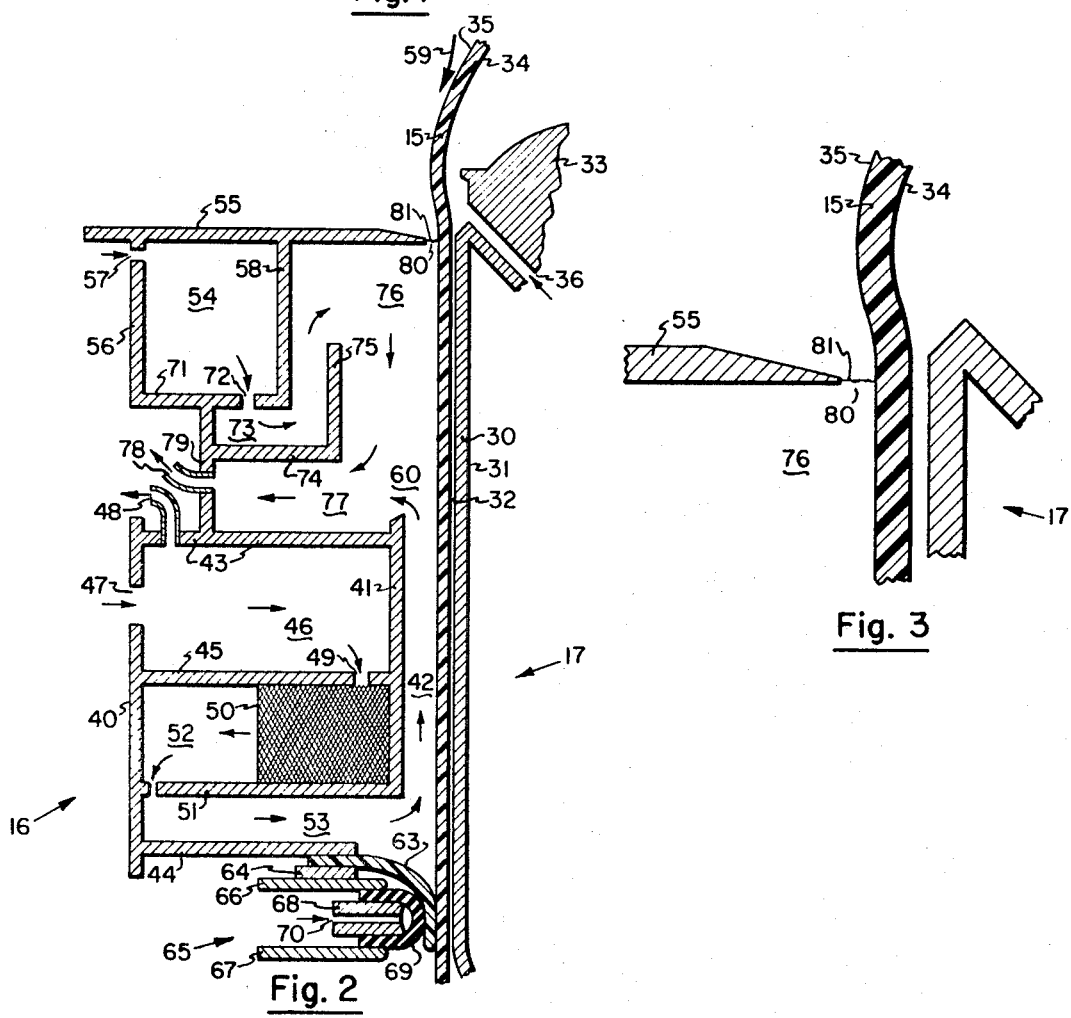
Fig. 2
Fig. 3

3,622,657

METHOD FOR FORMING AND COOLING THERMOPLASTIC FILM

BACKGROUND OF THE INVENTION

As is well known to those skilled in the art, thermoplastic films may be prepared by extruding a body of film through a die to produce a body of film which may then be cooled, slit if desired, and thereafter further treated to produce a product film suitable for use in packaging. The high-speed extrusion and processing of this film requires extreme care in handling; and it has not heretofore been possible to effect cooling at rates which are sufficiently high to permit fullest utilization and most effective operation of the extruding step and other portions of the process train. This has been so primarily because of the difficulties accompanying the quenching of the film in the cooling steps.

It is an object of this invention to provide a novel process and apparatus for forming thermoplastic film. Other objects will be apparent to those skilled in the art from inspection of the following description.

SUMMARY OF THE INVENTION

In accordance with certain of its aspects, the novel process of this invention for the formation of a thermoplastic film may comprise:

a. extruding a thermoplastic resin generally downwardly in the form of a molten, thermoplastic film body;

b. passing said film body downwardly through a cooling cell containing cooling liquid;

c. passing a first stream of cooling liquid in a turbulent zone in said cell at high relative velocity in countercurrent flow in contact with the lower portion of the surface of said film body;

d. passing a second stream of cooling liquid in a quiescent zone in said cell at moderate relative velocity in cocurrent flow in contact with the upper portion of the surface of said film body;

e. withdrawing said first and said second stream from a transition zone adjacent to the surface of said film body at a medial point thereon; and f. thereafter recovering said film body.

In accordance with certain of its more specific aspects, the novel process of this invention for forming a tubular thermoplastic film may comprise:

a. extruding a thermoplastic resin generally downwardly in the form of a molten, thermoplastic, substantially tubular film body;

b. passing said film body downwardly around a cooling mandrel positioned in a cell containing cooling liquid;

c. directing cooling gas upwardly through an inside portion of said downwardly moving film body prior to contact with said mandrel thereby partially cooling and simultaneously expanding said film body to a diameter larger than the diameter of said mandrel and preventing the condensation of volatile products on said mandrel at the point where the film contacts said mandrel;

d. sliding the inside surface of said partially cooled, expanded tubular film body downwardly over the outer surface of said cooling mandrel whereby the inside surface of said tubular film is maintained in contact with at least a portion of said mandrel by pressure exerted by the cell cooling liquid and is cooled through contact with said mandrel;

e. passing a first stream of cooling liquid in a turbulent zone in said cell at high relative velocity in countercurrent flow in contact with the lower portion of outer surface of said film body;

f. passing a second stream of cooling liquid in a quiescent zone in said cell at moderate relative velocity in cocurrent flow in contact with the upper portion of the outer surface of said film body;

g. withdrawing said first stream and said second stream from a transition zone adjacent to the outer surface of said film body at a medial point on said mandrel; and h. thereafter recovering said tubular film.

DESCRIPTION OF THE INVENTION

The thermoplastic resins which may be employed in practice of this invention may typically include polyamides, polyolefins, e.g., polyethylene (low density or high density) and polypropylene, etc. In practice of the process of this invention, solid polyolefin, typically crystalline polyolefins, may be extruded in one illustrative mode of operation, as in a screw-type extruder, at 165°–320° C. and 2,000 p.s.i.g.–6,000 p.s.i.g., say 4,000 p.s.i.g., either in the form of a flat sheet of film or as a tubular film. The novel process of this invention may permit attainment of outstanding advantages when used with tubular film; and, accordingly, this aspect will be typified. It will be apparent to those skilled in the art that corresponding steps may be employed when flat film is treated. Preferably the tubular film may be extruded through an annular die to yield a downwardly directed tubular film having an inside diameter of 6–48 inches, say 24 inches and a wall thickness (as it issues from the die) of 10 to 60 mils, say 30 mils. The downwardly moving molten sheet may be preliminarily contacted with air at minus 70° C. to plus 60° C., say 20° C., to precool the film to 160° C. to 280° C. Preferably, the air may contact the film both externally and internally, the air inside the film serving to support the film and to expand it to a larger diameter. Precooling may commonly be effected to an extent sufficient to achieve maximum polymer viscosity, but insufficient to generate a "frost line" on the film prior to further cooling. Typically, polypropylene film may be precooled to 180°–280° C., say about 200° C. and polyethylene film may be precooled to 160°–235° C., say about 170° C. at this point prior to further cooling.

The internal precooling gas may be passed upwardly within (i.e. countercurrently to) the downwardly descending tubular film. As the gas contacts the inside of the tubular film, it may, in addition to precooling, serve to expand the film to a diameter slightly larger than that of the cylindrical mandrel used in subsequent steps. The internal precooling gas carried away undesired volatile products. The external precooling gas preferably passes cocurrent with the film, i.e. downwardly.

In practice of this invention, the precooled downwardly moving tubular film may be passed over and around a vertically extending mandrel which is completely surrounded by the film. The mandrel, typically of essentially cylindrical shape, may be formed of a composition, preferably metal, through which heat transfer may readily occur. The outside diameter of the mandrel may commonly be 110 percent–170 percent, say 130 percent, of the diameter of the annular die. The outside diameter of the mandrel may be substantially the same as the inside diameter of the film whereby as the film passes downwardly thereover, cooling of the film may be effected.

Preferably, the mandrel may be internally cooled with cooling liquid, typically water entering at 2°–75° C., say 10° C., and leaving at 4°–76° C., say 12° C. The major portion of the vertically extending circumferential wall of the mandrel may be cooled by circulating liquid as hereinafter set forth.

In accordance with the process of this invention, the inside surface of the downwardly descending tubular film may be maintained in slideable contact with at least a portion of the cylindrical surface of the mandrel as the film passes thereover and is cooled.

In practice of this invention, the outside surface of the downwardly descending tubular film passing over the mandrel may be passed through a body of cooling liquid, preferably water, at 2°–90° C., maintained in a cooling cell. The static pressure of the cooling liquid in the cell assists in maintaining the tubular film in contact with the mandrel.

It is a feature of the novel process of this invention, in the preferred embodiment thereof, that the downwardly descending film may be passed through a static zone of cooling liquid, between the cover of the cooling cell and the mandrel—a horizontal distance typically less than 0.30 inch, commonly 0.03–0.30 inch, and preferably about 0.063 inch. The height of the narrow liquid column or static zone may be typically about 0.01–0.30 inch, say 0.125 inch. In this zone the lateral motion of the film may be stabilized. The film may be moving at this point downwardly at a velocity of 25–750 ft./min., say 300 ft./min. as it passes through the static zone of cooling liquid.

The downwardly moving film may pass from the static zone into a quiescent zone in the cell. In this zone, the cooling liquid may move at a moderate relative velocity cocurrently in contact with the upper portion of the outer surface of the film body. The velocity of the cooling water in the quiescent zone may typically be about 1–20 ft./min., say 10 ft./min.; and this linear rate of flow may be a moderate relative velocity with respect to the moving film body sufficient to maintain cocurrent preferably laminar flow. It will be apparent to those skilled in the art that the Reynolds number necessary to maintain laminar flow may be obtained by varying the width of the quiescent zone passage through which the liquid is flowing, the absolute velocity of the liquid, the density of the liquid, and the viscosity of the liquid.

The downwardly moving film may pass from the quiescent zone to a countercurrent zone in the cell. It is a feature of the novel process of this invention that the cooling fluid in the countercurrent or turbulent zone of the cooling cell passes at high relative velocity countercurrently to the direction of flow of the tubular film. Typically, the tubular film may be passing downwardly at a velocity of 25–750 ft./min., say 300 ft./min., as it passes over the cooled surface of the mandrel and through the cooling cell. Preferably, the upward velocity of the cooling fluid may be 10–40 ft./min., say 20 ft./min. and the relative velocity may be sufficient to generate a turbulent flow of cooling fluid countercurrently contacting the tubular film. It will be apparent to those skilled in the art that the relative velocity may be controlled by varying the velocity of the tubular film, the absolute velocity of the cooling liquid, the density of the cooling liquid, the viscosity of the cooling liquid, and the thickness of the passageway through which the liquid flows, i.e. by controlling the effective Reynolds number at the area of contact to insure that turbulent flow is achieved. The width of the annular passageway defining the turbulent zone may typically be 0.25–1.5 inch, say 0.5 inch.

It is a particular feature of this invention that when the thermoplastic film is polyethylene, the quiescent zone may preferably be at a warmer temperature than the turbulent zone. In this embodiment, the inlet temperature of the film to the quiescent zone may be 160°–235° C., say 180° C.; and the inlet temperature of the film to the turbulent zone may be 30°–95 C., say 85° C. The temperature of the film leaving the turbulent zone may be 5°–60° C., say 30° C. The temperature of the cooling liquid entering the quiescent zone may be 2°–90° C., say 75° C.; the temperature of the cooling liquid entering the turbulent zone may be 2°–50° C., say 10° C.

When the thermoplastic film is polypropylene, the quiescent zone may be at a cooler temperature than the turbulent zone. In this embodiment, the inlet temperature of the film to the quiescent zone may be 180°–280° C., say 200° C.; and the inlet temperature of the film to the turbulent zone may be 5°–80° C., say 30° C. The temperature of the film leaving the turbulent zone may be 15°–95° C., say 65° C. The temperature of the cooling liquid entering the quiescent zone may be 2°–70 C., say 10° C.; the temperature of the cooling liquid entering the turbulent zone may be 10°–90° C., say 70° C.

For other thermoplastics, the temperatures of operation may be varied according to the intrinsic properties of the thermoplastic being processed and the desired properties of the preferred product.

In the preferred embodiment, the cooling liquid exiting the cocurrent quiescent zone and the cooling liquid exiting the countercurrent turbulent zone will commingle in a transition or mixing zone wherein there may be a sharp boundary between the cocurrent and the countercurrent zones. The provision of a uniform and sharply delineated junction or boundary permits a high degree of control of the temperatures in each zone.

Cooling liquid in the transition or mixing zone may be withdrawn from the cooling cell at essentially transition zone temperature. The transition zone in the normal practice of the process of this invention may be positioned adjacent to the outer portion of the film body at a medial portion of the mandrel. Typically, it will be about 10 percent–80 percent, say 50 percent, of the vertical distance down from the top, i.e. the point at which the film first touches the mandrel.

Preferably, the process may be carried out so that cooling liquid contacts the tubular film (i.e. enters the turbulent zone) typically at a point 2–4 inches above the point at which the film leaves the mandrel.

The film may be withdrawn from the mandrel at a temperature of 5°–95° C. For polyethylene the temperature may be 5° C.–60 C., say 30° C.; for propylene the temperature may be 15° C.–95 C., say 65° C. It may be collapsed as by passage between pinch rolls and collected before further treatment to yield a product particularly characterized by its ability to be used as packaging material.

It may be observed that the body of film leaving the process of this invention may be substantially free of imperfections and of unevenness. The film may be particularly characterized by uniform thickness over its entire width.

In accordance with certain of its other aspects, this invention relates to a method utilizing a cooling cell, for containing cooling liquid, adapted to circumscribe an upstanding cylindrical mandrel over the cylindrical surface of which a thin tubular body may slideably move in a direction parallel to the main axis thereof from an inlet end to an outlet end thereof which comprises an upstanding outer wall adapted to circumscribe said mandrel and spaced from the cylindrical surface thereof; a first upstanding inner wall within said outer wall adapted to circumscribe the lower portion of said mandrel and narrowly spaced from the cylindrical surface thereof, thereby forming a first annulus immediately adjacent to and surrounding the lower portion of said mandrel whereby cooling liquid may move in countercurrent flow in said first annulus from said outlet end over the outer surface of said tubular body; a second upstanding inner wall within said outer wall adapted to circumscribe the upper portion of the outer wall of said mandrel and widely spaced from the cylindrical surface thereof, thereby forming a second annulus immediately adjacent to and surrounding the upper portion of said mandrel whereby cooling liquid may move in cocurrent flow in said second annulus over the outer surface of said tubular body, said first upstanding inner wall and said second upstanding inner wall defining therebetween a mixing zone; means for admitting cooling liquid to said cooling cell and to the lower end of said first annulus; means for admitting cooling liquid to said cooling cell and to the upper end of said second annulus; and means for withdrawing cooling liquid from said mixing zone.

In accordance with certain of its more specific aspects, this invention relates to a cooling cell, for containing cooling liquid, adapted to circumscribe an upstanding cylindrical mandrel over the cylindrical surface of which a thin tubular body may slideably move in a direction parallel to the main axis thereof from an inlet end to an outlet end thereof which comprises an upstanding outer wall adapted to circumscribe said mandrel and spaced from the cylindrical surface thereof; a laterally extending bottom wall joining said upstanding outer wall and terminating at an inner edge adjacent to said mandrel; resilient seal means on the inner edge of said bottom wall projecting therefrom toward said mandrel whereby said tubular body may pass between said mandrel and said seal means, a first upstanding inner wall within said outer wall adapted to circumscribe the lower portion of the outer wall of said mandrel and narrowly spaced from the cylindrical surface thereof, thereby forming a first annulus immediately adjacent to and surrounding the lower portion of said mandrel whereby cooling liquid may move in countercurrent flow in said first annulus from said outlet end over the outer surface of said tubular body; a second upstanding inner wall within said outer wall adapted to circumscribe the upper portion of the outer wall of said mandrel and widely spaced from the cylindrical surface thereof, thereby forming a second annulus immediately adjacent to and surrounding the upper portion of said mandrel whereby cooling liquid may move in cocurrent flow in said second annulus over the outer surface of said tubular body, said first upstanding inner wall and said second upstanding inner wall defining therebetween a mixing zone; a laterally extending cover plate fitting over said cooling cell, defining said quiescent zone, and terminating at a point closer to said mandrel than said first upstanding inner wall, thereby forming a static zone through which said thin tubular body passes to said quiescent zone; means for admitting cooling liquid to said cooling cell and to the lower end of said first annulus; means for admitting cooling liquid to said cooling cell and to the upper end of said second annulus; and means for withdrawing cooling liquid from said mixing zone.

DESCRIPTION OF A PREFERRED EMBODIMENT

The novel process of this invention may be carried out in accordance with certain specific embodiments thereof, by the technique shown in the drawing wherein:

FIG. 1 shows an overall schematic view of the process and apparatus.

FIG. 2 shows, in detailed cross section, a portion of the apparatus disclosed in FIG. 1.

FIG. 3 shows more detail of the apparatus of FIGS. 1 and 2.

In carrying out the process of this invention in accordance with FIG. 1 of the drawing, thermoplastic may be admitted to screw extruder 10 through hopper 11 from which extrudate passes through conduit 12 and rotating or oscillating assembly including die 13 to annulus 14 from which it may be extruded as a tubular film 15. The film 15 is passed over mandrel 17 as the external surface of the film is cooled in cooling cell 16. The film 15 may be collapsed by rolls 18 and thereafter subjected to further treatment. If it be desired for special purposes, for example, to monoaxially orient the film, it may be heated on roll 19, stretched between stretch rolls 20 and 21, and cooled on roll 22.

In FIG. 2, there are shown details of a typical structure including the structure of the mandrel 17 and the cooling cell 16 of FIG. 1. FIG. 3 shows additional details of FIG. 2. In FIG. 2, tubular film 15 passes over mandrel 17 while simultaneously passing through cooling cell 16. Mandrel 17 includes, in this embodiment, cylindrical body portion 30 having inner wall 31 and outer wall 32. The mandrel 17 includes cover 33; and air inlet conduit 36 is positioned between at least certain portions of cover 33 and cylindrical body portion 30 of the mandrel. Film 15 includes inner surface 34 and outer surface 35.

The cooling cell 16 may, in this embodiment, include a generally upstanding peripheral circumferential, preferably cylindrical, ring serving as outer wall 40 which defines the cell 16. Upstanding peripheral circumferential, preferably cylindrical, ring may serve as first inner wall 41 typically mounted coaxially with respect to mandrel 17 thereby defining the annular channel 42. The inside diameter of ring 41 may be positioned with respect to the outside diameter of mandrel 17 to insure that annulus 42 is preferably sized to permit turbulent flow of liquid therein. Extending between rings 40 and 41, which may be vertical (i.e. parallel to the axis of mandrel 17) in this embodiment, laterally extending top ring 43 and laterally extending bottom ring or wall 44 define the lower portion of the body portion of cooling cell 16. Bottom ring 44 may be considered a portion or an extension of ring 40, it being apparent that together they form the lower enclosing surface of the cell 16. Preferably mounted therebetween may be laterally extending baffle ring 45.

Top ring 43 and baffle ring 45 define plenum chamber 46 to which cooling liquid may be admitted through opening 47. Gas, including air, contained in liquid admitted through 47 may be discharged from slowly moving liquid in plenum chamber 46 and may exit through opening 48. Deaerated liquid in chamber 46 may exit therefrom through openings 49 and pass through packed bed 50, mounted on ring 51 preferably containing wire mesh, and thence into storage chamber 52.

From chamber 52, cooling liquid may pass through passageway 53 into annular channel 42. As liquid passes through annular channel 42 at high velocity, it presses against the outer surface 35 forcing film 15 and inner surface 34 thereof against the outer wall 32 of mandrel 17. Upflowing liquid in the turbulent zone in channel 42 enters transition or mixing zone 60.

Cooling liquid may enter the upper portion of the body portion of cooling cell 16 through opening 57 in upper entrance ring 56 from which it may pass through upper plenum chamber 54 defined by entrance ring 56, cover plate 55, upper plenum wall 58, and plenum floor 71. Cooling liquid may pass through opening 72 in plenum floor 71 and thence through channel 73 formed by lower channel wall 74 and upstanding channel wall 75. Cooling liquid from channel 73 passes to quiescent zone 76 wherein it may move downwardly at a moderate relative velocity preferably in laminar flow cocurrently in contact with the upper portion of the outer surface 35 of the film body 15.

The downwardly flowing cooling liquid in quiescent zone 76 and the upwardly flowing liquid in turbulent zone 42 may contact and mix in transition or mixing zone 60 wherein because of the flow of cooling liquid, there may be a sharp boundary between the upwardly flowing liquid flow and the downwardly flowing liquid flow. Cooling liquid in zone 60 may exit through channel 77 and outlet 78 in wall7 9.

It is a particular feature of this invention that cover plate 55, preferably beveled at its inner edge, is positioned to cover the upper level of liquid in quiescent zone 76 and to lie at a point slightly above the point of initial contact between film 15 and mandrel 17. When these conditions prevail, and the liquid level touches the lower face of cover plate 55, there is no disturbance of the liquid surface by the downwardly directed air 59 coming from air ring not shown. The area between cover plate 55 and mandrel 17 forms a static zone 80, defined by the cover plate 55 and mandrel 17, in which the liquid level 81 may be above the lower face of cover plate 55.

In this zone, the lateral motion of the film may be stabilized and dynamic stability given to the high velocity downwardly moving film. Typically the static zone 80 may be 0.01–0.30 inch, say 0.125 inches, high and 0.03–0.30 inch, say 0.063 inches, wide.

Liquid may be maintained in cooling cell 16 by exit seal 63. Exit seal 63, typically of Teflon, may be mounted between bottom ring 44 and clamping ring 64 and may slideably bear against film 15. Exit seal 63 may be fixed in position by sealing assembly 65 including upper support ring 66, and lower support ring 67. Mounted therebetween may be pressure ring holder 68 containing pressure ring 69 (preferably of thin rubber), holder 68 having conduit 70 through which fluid, typically air, may be forced to urge pressure ring 69 against exit seal 63 and film 15, thus providing a snug fit between seal 63, film 15, and mandrel 17.

In accordance with a preferred embodiment of this invention, crystalline polyethylene having a density of 0.926, a melt index of 6–8 may be passed at a rate of 600 pounds/hour through screw extruder 10 from hopper 11. Extrudate formed at 4,000 p.s.i.g. and 225° C. may be extruded through rotary head 13. Head 13 may rotate about a vertical axis at a velocity of 2–4 r.p.m. Annulus 14 may be an orifice with an internal diameter of 24 inches and an annular opening of 30 mils; and tubular film 15, at the point of formation may have the noted dimensions.

The tubular film, leaving the die at 18 ft./min. and moving downwardly at a linear velocity increasing to 300 ft./min. at the mandrel, may be contacted with downwardly directed air 59 at 20° C. to precool the film to about 180° C.

The precooled film may be passed over a mandrel 17, which in this embodiment includes a metal cylinder about 10 inches in height and having a diameter of 30 inches. The mandrel may be cooled internally with cooling water entering at 10° C. and leaving at 15° C. As the downwardly moving tube of polyethylene passes over the surface 32 of the mandrel 17, it is contacted on the outer surface 35 thereof by cooling water in a cooling cell 16.

Cooling cell 16 may include a cylindrical ring 40, of internal diameter of about 40 inches, and a height of about 5 inches serving as the outerwall 40 which defines the cell 16. The inner wall 41 of the cell may be about 4 inches high. The annular channel 42 (defined by the first inner wall 41 and the film 15) may be 0.25–1.5 inches, preferably 0.5 inches in this embodiment. Entrained gas, typically air, admitted with cooling water at 10° C., entering through opening 47 may be withdrawn through vent 48. Cooling water in an amount of 6.5 ft.³/min., passing through plenum chamber 46, defined by top ring 43 and baffle ring 45 may be admitted to packed bed 50 and thereafter to storage chamber 52 and passageway 53.

Cooling water may leave passageway 53 and enter annular channel 42 wherein it moves upwardly in turbulent flow at a velocity of 20 ft./min. Annular channel 42, defined by first inner wall ring 41 and tube 15 may be 0.5 inches across, i.e. annular radius—the distance from ring 41 to tube 15.

Cooling water at 75° C. may enter through opening 57, in upper entrance 56, pass through upper plenum chamber 54, openings 72 and channel 73 to quiescent zone 76. In this zone, cooling water may move downwardly at a moderate relative velocity of 10 ft./min.

Downwardly moving cooling water leaving quiescent zone 76 and upwardly moving cooling water leaving turbulent zone 42 may contact and mix in transition or mixing zone 60. In this zone 60 there will be observed a sharply delineated boundary between the downflowing and upflowing water. Water may pass through channel 77 and exit therefrom through outlet 78 in amount of 13 ft.³/min. at 45° C.

Segmented cover plate 55, mounted to define top chamber 54, may be spaced from film 15 by a small gap typically 0.03–0.30 inch, in this embodiment 0.063 inch. The thickness of the cover plate 55, at the point of closest approach to mandrel 17, may be less than about 0.125 inch, and in this embodiment 0.625 inch. The height of the static zone or narrow liquid column 79 may typically be up to 0.125 inch and the liquid level 80 may normally be between the upper and lower surfaces of plate 55.

As descending film 15 passes downwardly over mandrel 17 it is stabilized and freed of ripples as it passes through static zone 71. It may then be initially cooled in quiescent zone 76 before being passed through turbulent zone 42. At the lower portion of zone 42, it may leave the cooling cell 16 by passing through exit seal 63, a Teflon seal, maintained in place by pressure ring 69.

The film 15 may leave the cooling cell 16 at temperature of 30° C. and be flattened at pinch roll 18 and thereafter recovered, if desired, as cast polyethylene to yield a film which is suitable for packaging.

Although this invention has been described with reference to a specific embodiment, it will be apparent to those skilled in the art that various changes and embodiments may be made therein which clearly fall within the scope of this invention.

What is claimed is:

1. A process for the formation of a thermoplastic film comprising:
   a. extruding a thermoplastic resin generally downwardly in the form of a molten, thermoplastic film body;
   b. passing said film body downwardly through a cooling cell containing cooling liquid;
   c. passing a first stream of cooling liquid in a turbulent zone in said cell at high relative velocity in countercurrent flow in contact with the lower portion of the surface of said film body;
   d. passing a second stream of cooling liquid in a quiescent zone in said cell at moderate relative velocity in cocurrent flow in contact with the upper portion of the surface of said film body;
   e. withdrawing said first and said second stream from a transition zone adjacent to the surface of said film body at a medial point therein; and
   f. thereafter recovering said film body.

2. A process for the formation of a tubular thermoplastic film comprising:
   a. extruding a thermoplastic resin generally downwardly in the form of a molten, thermoplastic substantially tubular film body;
   b. passing said film body downwardly around a cooling mandrel positioned in a cell containing cooling liquid;
   c. directing cooling gas upwardly through an inside portion of said downwardly moving film body prior to contact with said mandrel thereby partially cooling and simultaneously expanding said film body to a diameter larger than the diameter of said mandrel and preventing the condensation of volatile products on said mandrel at the point where the film contacts said mandrel;
   d. sliding the inside surface of said partially cooled, expanded tubular film body downwardly over the outer surface of said cooling mandrel whereby the inside surface of said tubular film is maintained in contact with at least a portion of said mandrel by pressure exerted by the cell cooling liquid and is cooled through contact with said mandrel;
   e. passing a first stream of cooling liquid in a turbulent zone in said cell at high relative velocity in countercurrent flow in contact with the lower portion of the outer surface of said film body;
   f. passing a second stream of cooling liquid in a quiescent zone in said cell at moderate relative velocity in cocurrent flow in contact with the upper portion of the outer surface of said film body;
   g. withdrawing said first stream and said second stream from a transition zone adjacent to the outer surface of said film body at a medial point on said mandrel, and
   h. thereafter recovering said tubular film.

3. A process for the formation of tubular thermoplastic film as claimed in claim 2 wherein said thermoplastic resin is selected from the group consisting of polypropylene and polyethylene.

4. A process for the formation of tubular thermoplastic film as claimed in claim 2 wherein said thermoplastic resin is polypropylene and the quiescent zone is at a cooler temperature than the turbulent zone.

5. A process for the formation of tubular thermoplastic film as claimed in claim 2 wherein said thermoplastic resin is polyethylene and the quiescent zone is at a warmer temperature than the turbulent zone.

6. A process for the formation of tubular thermoplastic film as claimed in claim 2 wherein said film body passes through a static zone prior to admission to said quiescent zone.

7. A process as claimed in claim 2 for the formation of a tubular polyethylene film comprising:
   a. extruding polyethylene generally downwardly in the form of a molten, thermoplastic substantially tubular film body;
   b. passing said film body at 160° C. to 235° C. downwardly around a cooling mandrel positioned in a cell containing cooling liquid;
   c. directing cooling gas upwardly through an inside portion of said downwardly moving film body prior to contact with said mandrel thereby partially cooling and simultaneously expanding said film body to a diameter larger than the diameter of said mandrel and preventing the condensation of volatile products on said mandrel at the point where the film contacts said mandrel;
   d. sliding the inside surface of said partially cooled, expanded tubular film body downwardly over the outer surface of said cooling mandrel whereby the inside surface of said tubular film is maintained in contact with at least a portion of said mandrel by pressure exerted by the cell cooling liquid and is cooled through contact with said mandrel;

e. passing a first stream of cooling liquid in a turbulent zone in said cell at high relative velocity in countercurrent flow in contact with the lower portion of outer surface of said film body thereby cooling said polyethylene film to 3° C. to 60° C.

f. passing a second stream of cooling liquid in a quiescent zone in said cell at moderate relative velocity in cocurrent flow in contact with the upper portion of the outer surface of said film body thereby cooling said polyethylene film to 30° C. to 95° C.

g. withdrawing said first stream and said second stream from a transition zone adjacent to the outer surface of said film body at a medial point on said mandrel, and h. thereafter recovering said tubular film.

8. A process as claimed in claim 2 for the formation of a tubular polypropylene film comprising:

a. extruding a thermoplastic resin generally downwardly in the form of a molten, thermoplastic substantially tubular film body;

b. passing said film body at 180° C. to 280° C. downwardly around a cooling mandrel positioned in a cell containing cooling liquid;

c. directing cooling gas upwardly through an inside portion of said downwardly moving film body prior to contact with said mandrel thereby partially cooling and simultaneously expanding said film body to a diameter larger than the diameter of said mandrel and preventing the condensation of volatile products on said mandrel at the point where the film contacts said mandrel;

d. sliding the inside surface of said partially cooled, expanded tubular film body downwardly over the outer surface of said cooling mandrel whereby the inside surface of said tubular film is maintained in contact with at least a portion of said mandrel by pressure exerted by the cell cooling liquid and is cooled through contact with said mandrel;

e. passing a first stream of cooling liquid in a turbulent zone in said cell at high relative velocity in countercurrent flow in contact with the lower portion of outer surface of said film body thereby cooling said polypropylene film to 15° C. to 95° C.

f. passing a second stream of cooling liquid in a quiescent zone in said cell at moderate relative velocity in cocurrent flow in contact with the upper portion of the outer surface of said film body thereby cooling said polypropylene film to 5° C. to 80° C.

g. withdrawing said first stream and said second stream from a transition zone adjacent to the outer surface of said film body at a medial point on said mandrel, and h. thereafter recovering said tubular film.

* * * * *